(12) United States Patent  
Paaske et al.

(10) Patent No.: US 9,747,435 B2
(45) Date of Patent: Aug. 29, 2017

(54) AUTHENTICATION AND CONTROL OF ENCRYPTION KEYS

(71) Applicant: Apple Inc., Cupertino, CA (US)

(72) Inventors: Timothy R. Paaske, Cupertino, CA (US); Weihua Mao, Monte Sereno, CA (US); Shu-Yi Yu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 14/696,581

(22) Filed: Apr. 27, 2015

(65) Prior Publication Data

US 2016/0314295 A1  Oct. 27, 2016

(51) Int. Cl.
*G06F 21/00* (2013.01)
*G06F 21/46* (2013.01)
*G06F 21/60* (2013.01)

(52) U.S. Cl.
CPC ............ *G06F 21/46* (2013.01); *G06F 21/602* (2013.01)

(58) Field of Classification Search
CPC ................................ G06F 21/46; G06F 21/602
See application file for complete search history.

(56) References Cited

U.S. PATENT DOCUMENTS

| | | | |
|---|---|---|---|
| 6,834,112 B1 | 12/2004 | Brickell | |
| 6,985,953 B1 | 1/2006 | Sandhu et al. | |
| 7,373,500 B2 | 5/2008 | Ramelson et al. | |
| 8,332,907 B2 | 12/2012 | Canning et al. | |
| 8,806,607 B2 | 8/2014 | Archer et al. | |
| 9,317,449 B2 * | 4/2016 | Ducharme | G06F 12/1408 |
| 2006/0209584 A1 * | 9/2006 | Devadas | G06F 21/31 365/52 |
| 2007/0042754 A1 | 2/2007 | Bajikar et al. | |
| 2009/0319802 A1 * | 12/2009 | Walmsley | B41J 2/17546 713/189 |
| 2010/0189262 A1 * | 7/2010 | Ducharme | G06F 21/602 380/277 |
| 2012/0198241 A1 * | 8/2012 | O'Hare | G06F 21/602 713/189 |
| 2013/0042307 A1 * | 2/2013 | Imamura | H04L 67/325 726/4 |
| 2013/0101114 A1 * | 4/2013 | Kim | G06F 21/73 380/44 |
| 2014/0013406 A1 | 1/2014 | Tremlet | |
| 2014/0136855 A1 * | 5/2014 | Ducharme | G06F 21/602 713/193 |
| 2014/0201828 A1 * | 7/2014 | Yoo | G06F 21/567 726/13 |
| 2016/0154744 A1 * | 6/2016 | Zheng | H04L 9/0822 713/193 |

* cited by examiner

*Primary Examiner* — Mahfuzur Rahman
(74) *Attorney, Agent, or Firm* — Meyertons, Hood, Kivlin, Kowert & Goetzel, P.C.

(57) ABSTRACT

An apparatus, a method, and a system are presented in which the apparatus may include a security circuit, a processor, and an interface controller. The security circuit may be configured to generate a keyword. The processor may be configured to determine one or more policies to be applied to usage of the keyword, and to generate a policy value. The policy value may include one or more data bits indicative of the determined one or more policies. The interface controller may be configured to generate a message including the keyword and the policy value. The interface controller may also be configured to send the message.

20 Claims, 6 Drawing Sheets

| bit field 301 | data bits 302 | description 303 |
|---|---|---|
| keyword select | b0 | which keyword should be used:<br>b0=0: use keyword 'A'<br>b0=1: use keyword 'B' |
| allowed algorithms | b1:4 | allowed cryptographic algorithms:<br>b1=1: Algorithm 1 is allowed<br>b2=1: Algorithm 2 is allowed<br>b3=1: Algorithm 3 is allowed<br>b4=1: Algorithm 4 is allowed |
| allowed modules | b5:8 | cryptographic modules allowed to use keyword:<br>b1=1: module 1 is allowed to use keyword<br>b2=1: module 2 is allowed to use keyword<br>b3=1: module 3 is allowed to use keyword<br>b4=1: module 4 is allowed to use keyword |
| keyword size | b9:10 | keyword size:<br>b9:10=00: use 'i' bit keyword<br>b9:10=01: use 'j' bit keyword<br>b9:10=10: use 'k' bit keyword<br>b9:10=11: use two 'i' bit keywords |
| direction | b11:12 | enable encryption and decryption:<br>b11=1: keyword may be used for encrypting data<br>b12=1: keyword may be used for decrypting data |
| additional operations | b13:15 | additional operations to use keyword:<br>b13=1: keyword must be decrypted<br>b14=1: keyword 'A' must be combined with keyword 'B'<br>b15=1: keyword must be descrambled |
| expiration date | b16:39 | date and time when keyword(s) expire:<br>b16=39: 24 bit value corresponding to a date and a time of day |
| revocation | b40:47 | indication for a next time period to update a revocation list (i.e., a revocation epoch) |
| authentication | b48:175 | hash value for authenticating the keyword message |
| keyword(s) | b176:431 | values of the included keyword(s) |

Policy value 304

AUTHENTICATION AND CONTROL OF ENCRYPTION KEYS

BACKGROUND

Technical Field

This disclosure relates to systems-on-a-chip (SOCs), and more particularly to security on SOCs.

Description of the Related Art

Because SOCs incorporate significant functionality in a small form factor, and because SOCs can be made power efficient, SOCs have become popular devices to include in portable electronic devices such a portable phones (cell phones), smart phones, personal digital assistants (PDAs), tablet computers, etc. These portable electronic devices now have significant processing power and are increasingly being used for financial management and transactions, user communications other than voice (text, email, web browsing, etc.), streaming video, etc. Accordingly, SOCs may operate on private user data as well as data belonging to others (e.g., copyrighted audio, video, and still images). Therefore, the security of the SOC and its ability to resist attacks meant to compromise secure data are becoming increasingly important features.

Some SOCs may utilize encryption to restrict access to secure data. The use of encryption, however, may necessitate a transfer of a keyword used for encrypting and decrypting the secure data between the SOC and a component with which the secure data is being shared. The use of the keyword, however, may introduce a vulnerability to attacks.

SUMMARY OF THE EMBODIMENTS

Various embodiments of a system, an apparatus, and a method of authenticating and control of encryption keys are disclosed. Broadly speaking, an apparatus may include a security circuit, a processor, and an interface controller. The security circuit may be configured to generate a keyword. The processor may be configured to determine one or more policies to be applied to usage of the keyword, and to generate a policy value. The policy value may include one or more data bits indicative of the determined one or more policies. The interface controller may be configured to generate a message including the keyword and the policy value. The interface controller may also be configured to send the message.

In another embodiment, the one or more policies may include an indication of one or more functional units of a plurality of functional units that are allowed to use the keyword. In a further embodiment, the one or more policies may include an allowable size for the keyword.

In a given embodiment, the one or more policies may include an indication that the keyword is allowed to be used for encrypting data and an indication that the keyword is allowed to be used for decrypting data. In another embodiment, the one or more policies include an indication of an amount of time for which the keyword may be used.

In one embodiment, the security circuit may be further configured to encrypt the keyword. In a further embodiment, the one or more policies may include an indication of one or more additional operations required to be performed on the message to decrypt the keyword.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f), interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

In some embodiments, SOCs may operate on private user data (e.g., a user's home address, phone numbers, and credit card information) as well as data belonging to others (e.g., copyrighted audio, video, and still images). SOCs operating on such data, therefore, may require an ability to resist attacks meant to compromise secure data. In such embodiments, SOCs may utilize encryption to restrict access to secure data or keyed hashing functions to authenticate another system with which the SOC is sharing the secure data. The use of encryption and keyed hashes, however, may necessitate a transfer of a keyword (also referred to herein as a "key" or "keys") used for encrypting and decrypting the secure data between the SOC and another system with which the secure data is being shared. The use of the keyword itself, however, may introduce a vulnerability to attacks. Once an SOC sends a keyword to another system, such as, for example, a memory device, the SOC may not be able to control the usage of the keyword, for example, how long the keyword may be used. Overuse of a keyword, may, in some embodiments, allow a hacker enough time to determine the keyword through various known hacking strategies.

Embodiments presented herein may demonstrate methods for establishing a set of rules or policies for usage of a security keyword. By establishing such policies, an SOC may be able set one or more rules governing usage of the keyword by internal components or external systems configured to abide by the policies. Such control over the usage of keywords may provide additional protection to secure and sensitive data.

Figure 1:
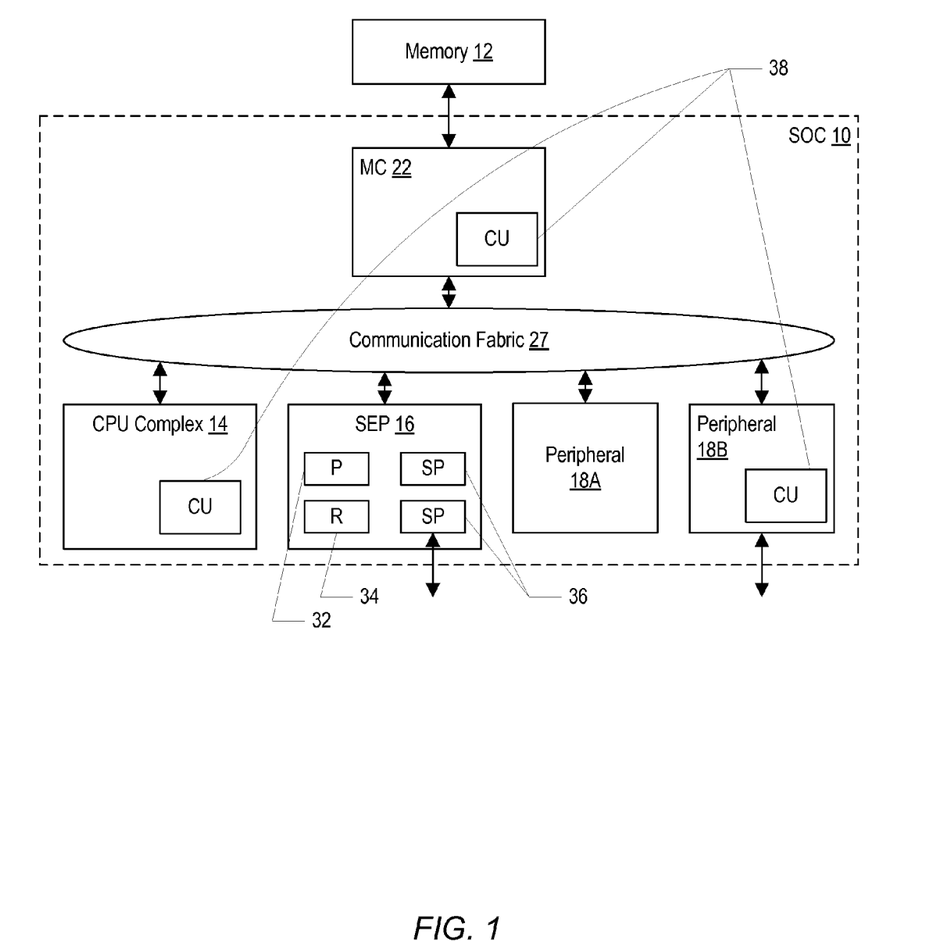
FIG. 1 is a block diagram of an embodiment of a system on a chip (SOC) including a security enclave processor (SEP).

Moving to FIG. 1, a block diagram of one embodiment of a system on a chip (SOC) is shown. The SOC 10 is coupled to a memory 12. In the illustrated embodiment, the components of the SOC 10 include a central processing unit (CPU) complex 14, a security enclave processor (SEP) 16, peripheral components 18A-18B (more briefly, "peripherals"), a memory controller 22, and a communication fabric 27. The components 14, 16, 18A-18B, and 22 are coupled to the communication fabric 27. The memory controller 22 may be coupled to the memory 12 during use, and may include one or more configuration registers in one embodiment. In various embodiments, the CPU complex 14 may include one or more processors and one or more cache memories (both not shown). The CPU complex may also include a cryptographic unit (CU) 38. As shown in FIG. 1, the peripheral component 18B and the memory controller 22 may also include a respective cryptographic unit 38. In the illustrated embodiment, the SEP 16 includes one or more processors 32, a secure boot ROM 34, and one or more security peripherals 36. The processor(s) 32 may be referred to herein as SEP processor(s) 32. It is noted that in one embodiment, the SOC 10 may be integrated onto a single semiconductor substrate as an integrated circuit "chip." In other embodiments, however, the components may be implemented on two or more discrete chips in a system.

The SEP 16 is an example of a security circuit. Generally, a security circuit may be any circuitry that is configured to perform one or more secure services for the rest of the SOC 10 (e.g., the other components in the SOC 10). That is, a component may transmit a request for a secure service to the security circuit, which may perform the secure service and return a result to the requestor. The result may be an indication of success/failure of the request and/or may include data generated by performing the service. For example, secure services may include various cryptographic operations such as authentication, encryption, decryption, etc. The result of an authentication operation may be a pass/fail indication, for example. The result of encryption/decryption operation may be the encrypted/decrypted data. Secure services may include secure key generation, where the keys may be used by components external to the security circuit for various security functions such as encryption or authentication. The result of secure key generation may be the key, or an encrypted key as described in greater detail below for an embodiment.

Secure services may include any services related to ensuring the protection of private data and/or preventing the unauthorized use of the system including the SOC 10. Protecting private data may include preventing unauthorized access (e.g., theft of data) and/or preventing corruption/destruction of the data. Protecting private data may include ensuring the integrity and confidentiality of the data, and the availability of the data to authorized access. Preventing unauthorized use may include, e.g., ensuring that a permitted use is paid for (e.g., network access by a portable device) and may also include deterring nefarious acts. Nefarious acts may include, for example, use of a device to consume power from a battery of the device so that authorized use is curtailed due to a lack of power, acts to cause damage to the system or to another system that interacts with the system, use of the device to cause corruption of data/software, etc. Secure services may include ensuring that the system is available to authorized users as well, and authenticating authorized users.

A security circuit may include any desired circuitry (e.g., cryptographic hardware, hardware that accelerates certain operations that are used in cryptographic functions, etc.). A security circuit need not include a processor. In some embodiments, however, such as, e.g., the embodiment shown in FIG. 1, a processor is included. The SEP processor 32 may execute securely loaded software. For example, the secure read-only memory (ROM) 34 may include software executable by the SEP processor 32. One or more of the security peripherals 36 may include an external interface, which may be connected to a source of software. The software from the source may be authenticated or otherwise verified as secure, and may be executable by the SEP processor 32. In some embodiments, software may be stored in a trust zone in the memory 12 that is assigned to the SEP 16 and the SEP processor 32 may fetch the software from the trust zone for execution.

The SEP 16 may be isolated from the rest of the SOC 10 except for a carefully-controlled interface (thus forming a secure enclave for the SEP processor 32, the secure boot ROM 34, and the security peripherals 36). Because the interface to the SEP 16 is carefully controlled, direct access to the SEP processor 32, the secure boot ROM 34, and the security peripherals 36 may be prevented. Various mechanisms may be used to prevent such direct access. For example, in some embodiments a secure mailbox mechanism may be implemented. In the secure mailbox mechanism, external devices may transmit messages to an inbox. The SEP processor 32 may read and interpret the message, determining the actions to take in response to the message. Response messages from the SEP processor 32 may be transmitted through an outbox, which may also be part of the secure mailbox mechanism. In such an embodiment, no other access from the external devices to the SEP 16 may be permitted. As described in greater detail below in conjunction with the description of FIG. 2, the SEP 16 may send encrypted and/or wrapped keys to some peripherals (e.g., 18A, 18B). In addition, the keys may include policy information that may control how the keys are used.

The security peripherals 36 may be hardware configured to assist in the secure services performed by the SEP 16. For example, the security peripherals may include authentication hardware implementing various authentication algorithms, encryption hardware configured to perform encryption, secure interface controllers configured to communicate over a secure interface to an external (to the SOC 10) device, etc.

Thus, in the illustrated embodiment, the SEP 16 may be an SOC within an SOC. The SEP 16 may be relatively autonomous from the remainder of the SOC 10. While communication between the SEP 16 and the remainder of the SOC 10 is supported, the SEP 16 may execute independent of the SOC 10 and vice versa.

The CPU complex 14 may include one or more CPU processors (not shown) that serve as the CPU of the SOC 10. The CPU of the system includes the processor(s) that execute the main control software of the system, such as an operating system. Generally, software executed by the CPU during use may control other components of the system to realize a desired functionality (except that, in some embodiments, the operating system may not control the SEP 16). The CPU processors may also execute other software, such as application programs. The application programs may provide user functionality, and may rely on the operating system for lower level device control. Accordingly, the CPU processors may also be referred to as application processors. The CPU complex may further include other hardware such as cache memory and/or an interface to the other components of the system (e.g., an interface to the communication fabric 27).

The peripherals 18A-18B may be any set of additional hardware functionality included in the SOC 10. For example, the peripherals 18A-18B may include video peripherals such as cameras, camera interfaces, image processors, video encoder/decoders, scalers, rotators, blenders, graphics processing units, display controllers, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g., the peripheral 18B) including interfaces such as Universal Serial Bus (USB), peripheral component interconnect (PCI) including PCI Express (PCIe), serial and parallel ports, as well as other input/output (I/O) interfaces, etc. The peripherals may include networking peripherals such as media access controllers (MACs). Any set of hardware may be included.

The memory controller 22 may generally include the circuitry for receiving memory requests from the other components of the SOC 10 and for accessing the memory 12 to complete the memory requests. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). In the illustrated embodiment, the memory controller 22 may include configuration registers (not shown) to identify trust zones within the memory address space mapped to the memory 12.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The cryptographic units 38 may each perform one or more cryptographic functions for the components in which they are included. For example, each cryptographic unit 38 may be used to encode/decode data using one or more encryption algorithms. Each individual cryptographic unit 38 may also be capable of performing, in whole or in part, a keyed hashing function. A "keyed hashing function" refers to a hash function that requires a keyword to generate a hash value. In addition to performing cryptographic functions, the cryptographic units 38 may be designed to receive policies associated with a keyword received from the SEP 16 and implement the policies on the keyword before using the keyword.

It is noted that the number of components of the SOC 10 (and the number of subcomponents for those shown in FIG. 1, such as within the CPU complex 14 and the SEP 16) may vary from embodiment to embodiment. There may be more or fewer of each component/subcomponent than the number shown in FIG. 1.

Figure 2:
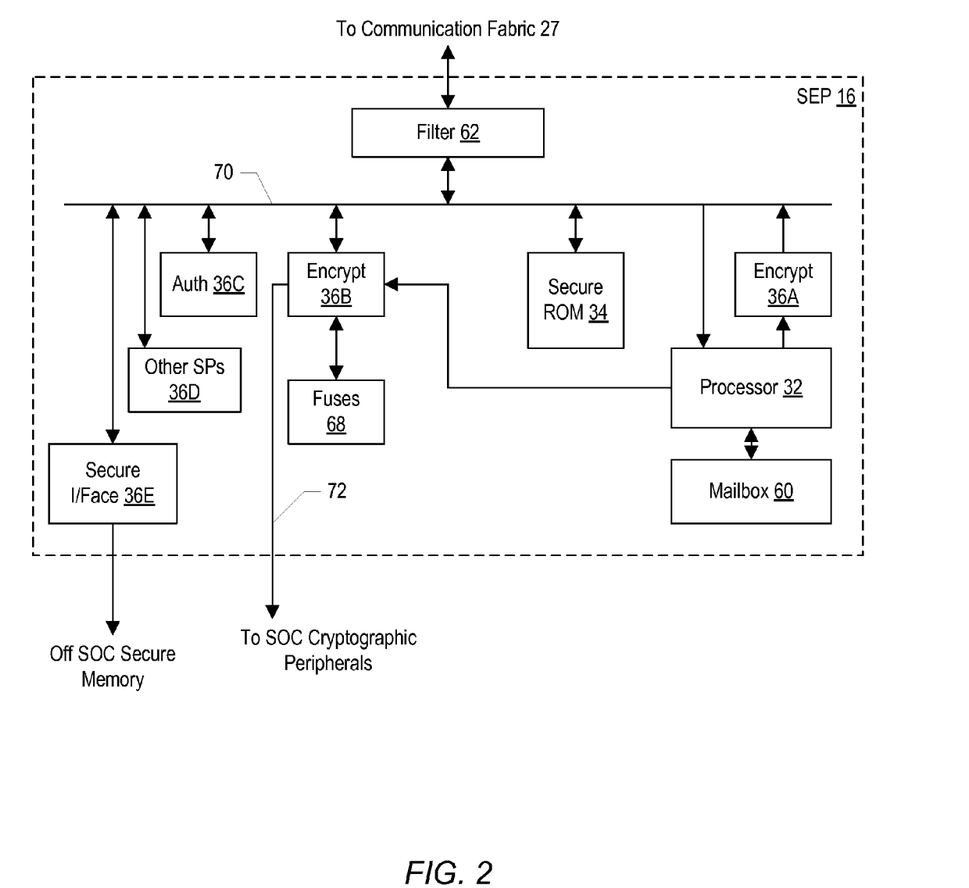
FIG. 2 is a block diagram illustrating an embodiment of a SEP.

Turning to FIG. 2, a block diagram illustrating more detailed aspects of the embodiment of the SEP of FIG. 1 is shown. In the illustrated embodiment, the SEP 16 includes the SEP processor 32, security peripherals 36A-36E, the secure ROM 34, secure mailbox 60, filter 62, and fuses 68. As shown, the filter 62 is coupled to the communication fabric 27 and to a local interconnect 70 to which the other components of the SEP 16 are also coupled. Like the communication fabric 27, the local interconnect 70 may have any configuration (bus-based, packet-based, hierarchical, point-to-point, cross bar, etc.). The security peripheral (Encrypt) 36B is coupled to the fuses 68 and to a secure bus 72. The security peripheral (Encrypt) 36A is coupled to the SEP processor 32, which is in turn coupled to the secure mailbox 60.

The filter 62 may be configured to tightly control access to the SEP 16 to increase the isolation of the SEP 16 from the rest of the SOC 10, and thus the overall security of the SOC 10. More particularly, in some embodiments, the filter 62 may permit read/write operations from the communication fabric 27 to enter the SEP 16 only if the operations address the secure mailbox 60. Other operations may not progress from the fabric 27 into the SEP 16. Further, the filter 62 may permit write operations to the address assigned to the inbox portion of the secure mailbox 60, and read operations to the address assigned to the outbox portion of the secure mailbox 60. All other read/write operations may be prevented by the filter 62. In one embodiment, the filter 62 may respond to other read/write operations with an error, or with garbage data. The filter 62, however, may allow read/write operations that come from the SEP 16. Likewise, the filter 62 may not filter responses from the fabric 27 that are provided in response to read/write operations issued by the SEP 16.

The secure mailbox 60 may include an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from the fabric 27 (e.g., issued by one of the CPU processors). The outbox may store write data from write operations sourced by the processor 32 (which may be read by read operations sourced from the fabric 27, e.g., read operations issued by one of the CPU processors).

In one embodiment, write data for write operations generated by the SEP processor 32 that are to be transmitted by the SEP 16 via the fabric 27 may optionally be encrypted. The security peripheral (encrypt) 36A may be an encryption circuit configured to encrypt the write data as it is provided by the processor to be transmitted on the fabric 27. An attribute of the write operation issued by the SEP processor 32 may indicate whether or not the data is to be encrypted. The attribute may be a packet field, in packet-based embodiments, a signal transmitted with the write operation, in bus-based embodiments, or may be transmitted in any other desired fashion. The encryption circuit 36A may implement any suitable encryption algorithm.

While the encryption circuit 36A is shown in line between the SEP processor 32 and the local interconnect 70, the encryption circuit 36A may actually be coupled in parallel with the processor to the local interconnect 70. The encryption circuit 36A may capture the write data (and the filter circuit 62 may ignore the write data) from the SEP processor 32 on the local interconnect 70 responsive to the encryption attribute indicating encryption, and the encryption circuit 36A may encrypt the write data and supply the encrypted write data on the local interconnect 70 to the filter 62 (which may relay the encrypted write data on the communication fabric 27 as the data for the write operation).

The secure ROM 34 is coupled to the local interconnect 70, and may respond to an address range assigned to the secure ROM 34 on the local interconnect 70. The address range may be hardwired, and the processor 32 may be hardwired to fetch from the address range at boot in order to boot from the secure ROM 34. The filter 62 may filter addresses within the address range assigned to the secure ROM 34 (as mentioned above), preventing access to the secure ROM 34 from requestors external to the SEP 16. As mentioned previously, the secure ROM 34 may include the boot code for the SEP 16. Additionally, in some embodiments, the secure ROM 34 may include other software executed by the SEP processor 32 during use (e.g. the code to process inbox messages and generate outbox messages, code to interface to the security peripherals 36A-36E, etc.). In an embodiment, the secure ROM 34 may store all the code that is executed by the SEP processor 32 during use.

A second encryption circuit (encrypt) 36B is included as a security peripheral, in this embodiment. The second encryption circuit 36B may implement any suitable encryption algorithm. In an embodiment, the second encryption circuit 36B is responsible for secure key generation. In such an embodiment, the second encryption circuit 36B is configured to output a key in hardware (e.g., via secure bus 72) to cryptographic circuits and/or other circuitry within SOC 10 and external to the SEP 16 such as the I/O peripherals, for example, which may use keys. In some embodiments, the key is sent to another block within the SEP 16, such as, e.g., the fuses 68, to be output external to the SEP 16. The output key may be a wrapping key in some embodiments, which may be used to encrypt a secure key. Wrapping keys may be sent to other cryptographic circuits via secure bus 72, rather than through filter 62 and communication fabric 27, to avoid exposure of the wrapping keyword to any software processes that may be running in CPU complex 14. The encrypted key, however, may be provided to software, preventing the unencrypted secure key from being exposed to software. The software may provide the encrypted key to the SOC cryptographic unit, which may decrypt the key using the wrapping key (received via secure bus 72) to obtain the secure key. The secure key may then be used for other encryption/decryption operations in the SOC cryptographic unit. Additional details will be provided further below.

In some embodiments, the SEP 16 may dictate how the keys may be used by certain other circuits and peripherals. Accordingly, in one implementation, the SEP processor 32 may execute software that may maintain and provide key policy information to the second encryption circuit 36B to be included with the secure key during the wrapping encryption. In such embodiments, the secure key may then be used according to the policy information. When a given encryption/decryption engine receives an encrypted key, it may authenticate and decrypt it (using the separately received wrapping key), producing the secure key. The given encryption/decryption engine may then enforce the policy included with the secure key. It is noted that in one embodiment, the encrypted keys may be provided in clear text form.

In one embodiment, there may be a variety of policies that may specify how the various wrapped security keys may be used. A policy field may be included with the secure key. The policy field may have a number of bits that may be grouped to form sub-fields that specify the key usage. Examples of key policies may include an indication of which components are allowed to use the key, an allowable size (number of bits) for the key, additional operations required to unwrap the secure key for use, an indication if the key may be used for encrypting data, an indication if the key may be used for decrypting data, an indication of with which encryption algorithms the key may be used, an indication of which key should be used if more than one secure key is included in the wrapper, and an indication of an amount of time for which the key may be used, i.e., an expiration time and/or date. Other key policies are contemplated and may be included in other embodiments.

As shown in FIG. 2 the second encryption circuit 36B is coupled to fuse block (fuses) 68. The fuses 68 may be any mechanism that may fix values in hardware at the time of manufacture. To "blow" or "blowing" a fuse may refer to an operation that changes a state of the fuse. For example, fuses may be selectively blown by laser or electrical activity during manufacture. A blown fuse may provide a binary one, and an unblown fuse may provide a binary zero, or vice versa. By selectively blowing multiple fuses, a multi-bit binary value may be generated.

More particularly, the fuses 68 may be blown to create a unique value for each instance of the SOC 10. That is, each instance of the SOC 10 may have the fuses blown in a different way so that the unique value is different for every SOC 10 manufactured. Thus, the unique value is an instance-specific value. If the unique value is used in generation of keys, those keys will be different than keys generated on another instance of SOC 10 even if other data used to generate the keys is the same between the different instances. The encryption circuit 36B may further include seeds that may be used with the unique value to generate keys. The seeds may be the same for each instance of the SOC 10. That is, the seeds may be instance-invariant. In an embodiment, two unique values may be provided from the fuses 68. More or fewer unique values may be provided from the fuses 68 in other embodiments.

An authentication circuit 36C may be another example of a security peripheral. The authentication circuit 36C may implement an authentication algorithm. For example, the authentication circuit 36C may implement a keyed-hash message authentication code (HMAC), or any other suitable authentication algorithm. The authentication circuit 36C may be used to validate the authenticity of a block of data or to authenticate the identity of a sender of the block of data. In addition to the authentication circuit 36C, there may be one or more other security peripherals 36D for performing various other security operations, such as, for example, random number generation and key storage/management.

In addition to security peripherals designed to perform specific functions, there may also be security peripherals that are interface units for secure interfaces such as the secure interface unit 36E. In the illustrated embodiment, the secure interface unit 36E may be an interface to an off SOC 10 ("off-chip") secure memory. For example, the interface may an interface to an off SOC Smart Card.

The security peripherals 36B-36E may have programming interfaces, which may be used by the SEP processor 32 (and more particularly by software executing on the SEP processor 32) to invoke the security peripherals 38B-38E to perform a particular task. For example, the peripherals may include registers (not shown) that may be read and written to control operation of the security peripherals. The peripherals may include a command interface that receives and interprets write operations as commands to be performed. Any interface for invoking the security peripherals may be used.

It is noted that the computing system of FIG. 2 is merely an embodiment for demonstrative purposes. Other embodiments may include different components and different numbers of components in the powered-down and powered-on power domains. In some embodiments, a variety of power domains with varying voltage levels may be included.

Figure 3:
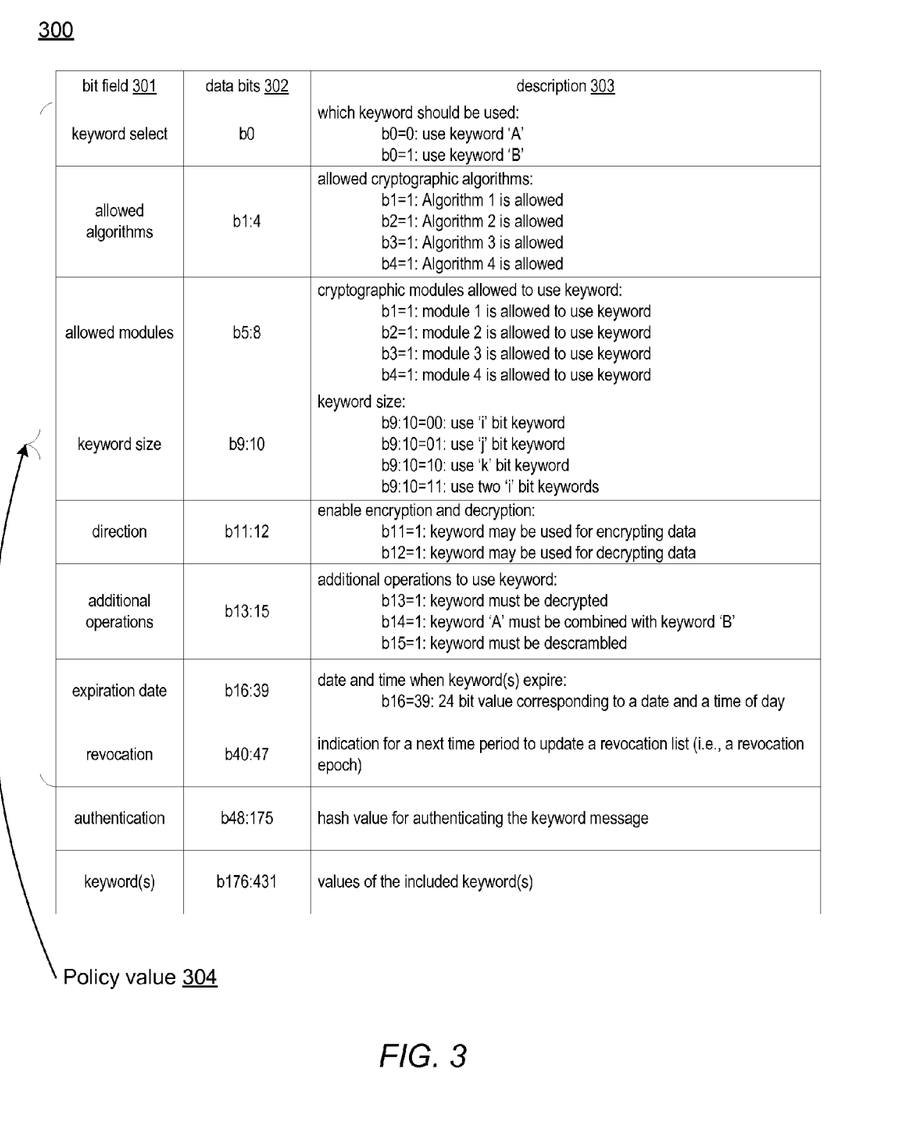
FIG. 3 is a table illustrating an embodiment of a format for sending a keyword by a SEP.

Moving now to FIG. 3, a table is presented illustrating an embodiment of message format for sending one or more keywords that include one or more policies controlling the use of the keyword(s). Table 300 may apply to keywords generated in a security enclave processor, such as, for example, the SEP 16 shown in FIG. 2. Table 300 includes three columns: bit field 301, data bits 302, and description 303. Bit field 301 includes a name for the corresponding bit field of the message. Data bits 302 indicates a number of bits of a given bit field and bit positions of the given bit field within the message. Description 303 includes a brief description of the corresponding bit field.

The message format of table 300 may correspond to a data packet generated in the SEP 16. More specifically, in some embodiments, the data packet may be generated, for example, in the second encryption circuit 36B. In the illustrated embodiment, the bit field 301 labeled "keyword select" is a single bit corresponding to bit 0 (abbreviated as "b0") of the data packet. Keyword select may determine which keyword should be used if more than one keyword is included in the data packet, with a b0 value of '0' corresponding to keyword 'A' and a b0 value of '1' corresponding to keyword 'B.' In some embodiments, a cryptographic algorithm may be used which uses two keywords (e.g., a public/private key combination may be used), in which case the keyword select field may be ignored and both keywords used by the algorithm.

The bit field 301 "allowed algorithms" comprises bits 1-4 of the data packet. Allowed algorithms may determine with which cryptographic algorithm or algorithms the included keyword(s) may be used. In the present example, four bits are assigned, with each bit enabling or disabling use of the keyword(s) for a corresponding cryptographic algorithm. In other embodiments, the bit field may be treated as a single value which may be used to determine the allowed algorithms.

The "allowed modules" bit field 301 comprises bits 5-8 in the data packet. Allowed modules may indicate which modules in SOC 10 are allowed to use the included keyword(s). As illustrated, each bit of the bit field may allow or disallow a respective module to use the included keyword(s). As with the allowed algorithms bit field, the allowed modules bit field may, alternatively, be treated as a single value which may be used to determine the allowed modules, such as, for example, as an index value to a look-up table.

The bit field 301 "keyword size" consists of bits 9-10 of the data packet and may indicate a size or length of the included keyword or keywords. As shown in table 300, the two bits forming keyword size may create a 2-bit value indicating one of four keyword size options. The "direction" bit field 301 includes bits 11-12 of the data packet and may indicate if the keyword(s) may be used for encryption, decryption, or both. In some embodiments, a third bit may be included to indicate if the keyword(s) may be used for keyed hashing functions, such as a SHA function.

The "additional operations" bit field 301 includes bits 13-15 of the data packet and may designate additional operation to be performed on the keyword(s) before the keyword(s) can be used. Each bit of the example bit field indicates if a respective operation needs to be performed. In the illustrated example, additional operations include decrypting the key, combining keyword 'A' and keyword 'B' such as by an exclusive 'OR' operation, and performing a descrambling (i.e., rearranging the order of the bits of the keyword). Various additional operations are contemplated and may be included in other embodiments.

The bit field 301 "expiration date" includes bits 16-39 to form a 24 bit value. The 24 bit expiration date may correspond to a time of day (e.g., 7:15 PM) and/or a calendar date (e.g., February $24^{th}$). In other embodiments, an amount of time may be indicated rather than a time of day, such as, for example, 10 seconds, 30 minutes, or one hour. At the expiration date, or after the amount of time elapses, the keyword(s) may be deleted and a new keyword or keywords requested. In some embodiments, the expiration date may be applied to a group or class of keywords. Examples of classes may include keywords generated within a given time period, keywords associated with a given type of data, and keywords associated with a common peripheral.

The revocation bit field 301 consists of bits 40-47 of the data packet and may indicate a time period for updating a revocation list. The revocation list may include a list of previously issued keywords that are no longer valid, allowing a module to delete a previously received keyword that is on the list. The revocation list may be updated periodically to add keywords that will no longer be accepted. The time period for updating the list is referred to as a revocation epoch in some embodiments.

Bits 0-47 of the data packet may collectively form a policy value. The policy value may include all policies to be applied to a corresponding keyword or keywords. Other embodiments of a policy value may not be limited to the policies illustrated in FIG. 3 and may include any suitable number of policies. Furthermore, in various embodiments, each policy may consist of any suitable number of data bits of the data packet.

In addition to the policy value, the data packet may include an "authentication" bit field 301, consisting of bits 48-175 and the "keyword(s)" bit field 301 consisting of bits 176-431. The authentication bit field may be a value used to authenticate the validity of the data packet. For example, the value may be equal to a result of an HMAC function performed on one or more bit fields (i.e., the keyword(s) and/or the policy value). The functional unit receiving the data packet may perform a similar HMAC function on the same bit fields and compare the result to the authentication value. If the two values match, then the data packet may be considered valid. If not, then the data packet may be deleted and the functional unit may request the keyword(s) to be resent.

The keyword(s) bit field may the value(s) of the keyword(s). In various embodiments, the keyword(s) may be encrypted, scrambled, or otherwise modified. In such embodiments, one or more operations may be performed before using the keyword(s). In some embodiments, the operations may be consistent an all keyword data packets, and therefore they may not be indicated by the "additional operations" bit field. Any suitable number of keywords may be sent in a data packet in various embodiments. In some embodiments, the size of this bit field may vary as needed for a particular keyword, while in other embodiments, the bit field may be a fixed size and any extraneous bits may be assigned a predetermined value. In such an embodiment, the keyword size bit field may indicate the actual size of the keyword.

It is noted that data format described by table 300 in FIG. 3 is merely an example and is not intended to imply a limitation to embodiments disclosed herein. Other bit fields may be included and some bit fields may be excluded. In various embodiments, each bit field may include a different number of bits that what is illustrated.

Figure 4:
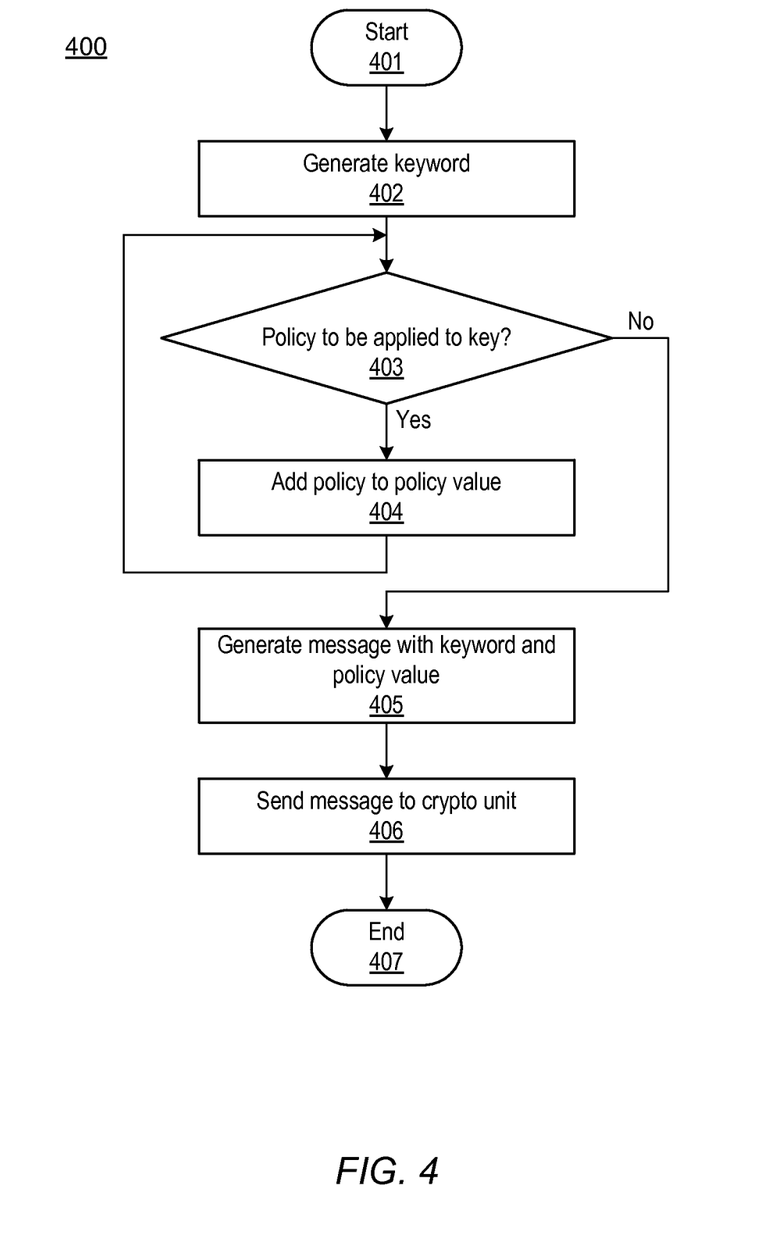
FIG. 4 is a flow diagram of a method for operating a SEP interface.

Turning now to FIG. 4, a flow diagram is presented to illustrate an embodiment of a method for generating a secure keyword that includes one or more policies. Method 400 may be applied to operational aspects of a security enclave processor, such as, for example, the SEP 16 shown in FIG. 2. Referring collectively now to FIG. 1, FIG. 2, and FIG. 4, method 400 may begin in block 401.

The SEP 16 may generate keyword (block 402). The SEP 16 may generate the keyword in response to a request from a cryptographic unit in SOC 10 (such as any of cryptographic units 38 in FIG. 1) or from a cryptographic unit in another device coupled to SOC 10. In other embodiments, an event other than a request may cause the SEP 16 to generate the keyword. In some embodiments, the SEP 16 may generate more than one keyword.

The method may depend on a determination if a policy should be applied to the keyword (block 403). The determination may depend on various factors, such as, for example, the cryptographic unit requesting the keyword, a type of event that triggered the generation of the keyword, a type of data with which the keyword is to be used, a type of algorithm with which the keyword is to be used, or any other suitable factors. For example, the SEP 16 may be aware that the keyword is to be used to encrypt a user's credit card number, and in response the SEP 16 may determine that the keyword should be encrypted and scrambled before sending. The SEP 16 may also determine that the keyword should only be used with a particular cryptographic algorithm and should only be valid for 15 minutes. If a policy is to be applied, then the method may move to block 404 to add the policy to a policy value. Otherwise, if no policies are needed, or if all needed policies have been added, then the method may move to block 405 to generate a message.

If a policy is needed, then the SEP 16 may determine a value for a corresponding bit field and add that value to the policy value (block 404). A policy value may be initialized with a default, predetermined value. If the SEP 16 determines at least one of the policies does not correspond to the default policy value in block 403, then a new value may be determined and the policy value may be updated. The method may return to block 403 to determine if another policy should be applied.

If the SEP 16 determines that no further policies need to be applied to the generated keyword, the SEP 16 may generate a message including the policy value and the keyword (block 405). The message may be generated in the form of a data packet with a predetermined format, such as, for example, the data format illustrated in FIG. 3. In addition to the keyword and policy value, other data may be included in the data packet, such as an authentication value for the cryptographic unit receiving the packet to determine if the received packet is valid. The authentication value may include a result of a keyed hash algorithm performed on at least some of the bits of the message. A keyed hash algorithm The SEP 16 may send the message to one or more cryptographic units (block 406). If the SEP 16 generated the keyword in response to a request from a single cryptographic unit, the SEP 16 may send the message to that single requestor via secure bus 72. In other embodiments, the SEP 16 may identify more than one cryptographic unit that should receive the keyword and, therefore, send the message via secure bus 72 to each of the identified cryptographic units. In some embodiments, the SEP 16 may broadcast the message to multiple cryptographic units by first sending the message to a processor in CPU complex 14. The processor may then forward the message to a list of cryptographic units or store the message in a memory accessible by the cryptographic units, relying on the policy and encryption to limit usage of the included keyword to appropriate cryptographic units. In such a broadcast mode, the appropriate cryptographic units may receive a wrapping key via the secure bus 72. The method may end in block 407.

It is noted that, method 400 of FIG. 4 is merely an example. In other embodiments, a different number of operations may be included or different orders or operations may be employed. In some embodiments, some of the operations may be performed in parallel.

Figure 5:
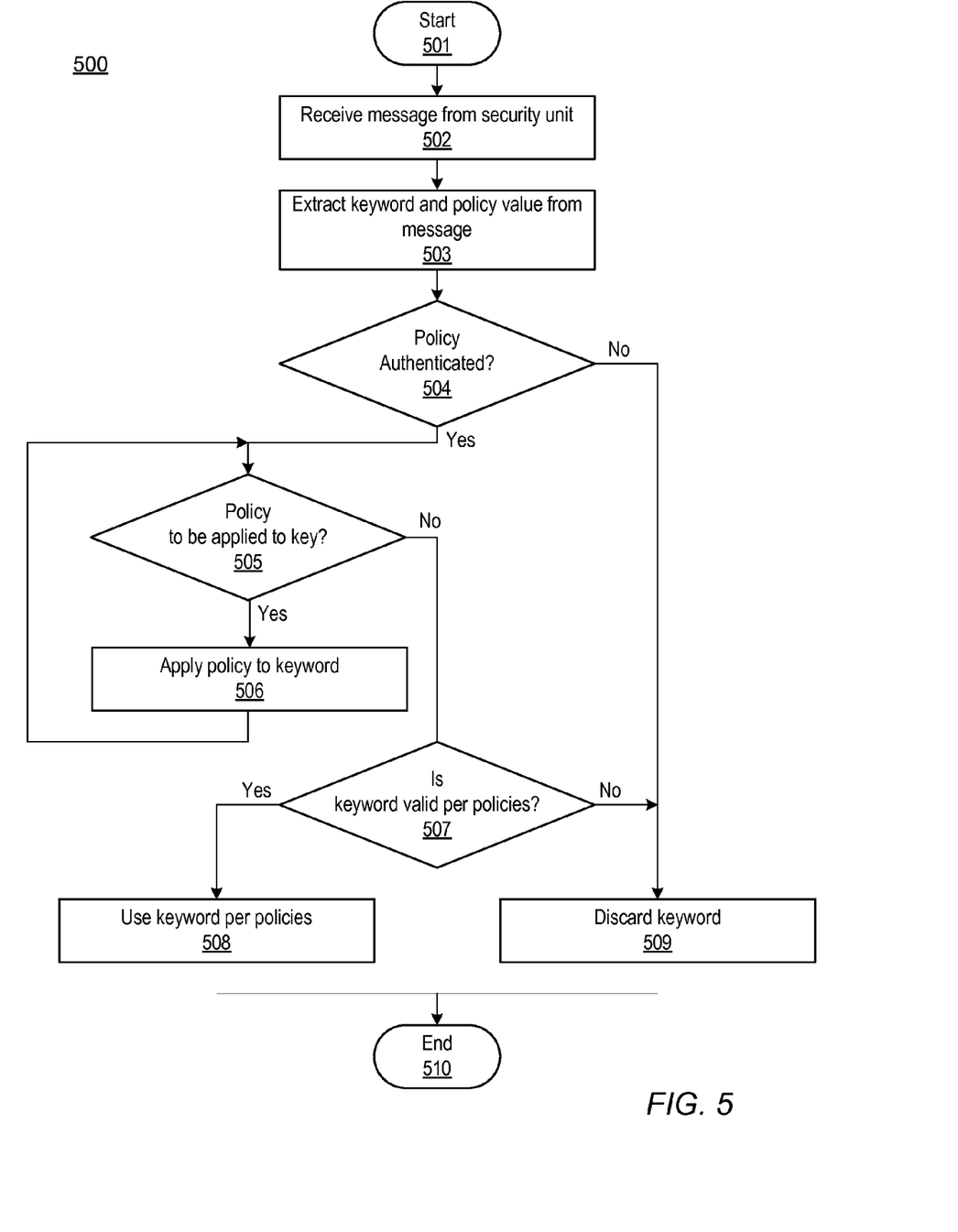
FIG. 5 illustrates a flow diagram describing operational aspects of receiving a keyword from a SEP interface.

Moving to FIG. 5, a flow diagram is presented to illustrate an embodiment of a method for receiving a secure keyword that includes one or more policies. Method 500 may be applied to operational aspects of a cryptographic unit, such as, for example, a given one of the cryptographic units 38 shown in FIG. 1. Referring collectively now to FIG. 1 and FIG. 5, method 500 may begin in block 501.

The given cryptographic unit 38 may receive a message from a security unit, such as, for example, the SEP 16 (block 502). The given cryptographic unit 38 may have requested a keyword or may have received data encrypted with the keyword. In some embodiments, the message may not come directly from the security unit, but instead from another peripheral or functional unit in SOC 10. For example, peripheral 18B may receive data and a corresponding message from CPU complex 14. CPU complex 14 may receive the message from SEP 16 and then forward it to peripheral 18B.

The given cryptographic unit 38 may extract a keyword and a policy value from the message (block 503). The received message may conform to a predetermined format, such as, for example, the format shown in FIG. 3, allowing the given cryptographic unit 38 to extract at least a keyword and a policy value from the message. The given cryptographic unit 38 may also extract additional information, such as an authentication value.

The method may depend on the authentication value (block 504). The given cryptographic unit 38 may determine if the received policy is valid dependent on the authentication value. An HMAC algorithm may be performed by the given cryptographic unit 38 and the result compared to the authentication value extracted from the message. If the result matches the authentication value, then the message is valid and the method may move to block 505 to apply the policy. Otherwise, the message may have been corrupted or may have been generated by an unauthorized source, in which case, the method may move to block 509 to discard the keyword.

The method may depend on the extracted policy value (block 505). Once extracted, the policy value may include indications if one or more policies are to be applied to the corresponding keyword. The given cryptographic unit 38 may determine if a given policy is to be applied, such as the additional operations described above in regards to FIG. 3. The given cryptographic unit 38 may also determine a value for other policies such as keyword size. If no further policies are to be applied, then the method may move to block 506 to determine if the keyword is valid. Otherwise, the method may move to block 505 to apply a determined policy.

The given cryptographic unit 38 may apply a policy to the keyword (block 506). The given cryptographic unit 38 may determine a given policy is to be applied, such as for example, the keyword may be limited to a particular cryptographic algorithm. In some embodiments, the policies may be implemented by setting or clearing a corresponding register bit in the given cryptographic unit 38. In other embodiments, the policies may be implemented by saving a predetermined value to a corresponding memory location. The method may return to block 504 to determine if further policies are to be applied.

Once the given cryptographic unit 38 determines all policies included in the policy value have been applied, the method may depend on a determination if the keyword is valid per the applied policies (block 507). The applied policies may, in some embodiments, result in a keyword that is invalid for the given cryptographic unit 38. For example, one policy may indicate that only certain cryptographic units 38 may use the associated keyword. If the given cryptographic unit 38 is not one of the indicated cryptographic units 38 (for example, the received message was received as a broadcast message from the SEP 16), then the keyword may be determined to be invalid for the given cryptographic unit 38. As another example, one policy may determine that the keyword is only for use with a particular cryptographic algorithm. If the given cryptographic unit 38 does not support the particular cryptographic algorithm, then the keyword may again be determined to be invalid for the given cryptographic unit 38. It is noted, that in such examples, the keyword may be still be valid for other cryptographic units 38. If the keyword is determined to be invalid, then the method may discard the keyword in block 508. Otherwise, the method may use the keyword in block 507.

If the keyword is determined to be valid per the policies, then the given cryptographic unit 38 may use the keyword in accordance with the determined policies (block 508). In some embodiments, the determined policies may include additional operations to be performed to the keyword before use, such as, for example, decrypting and/or descrambling the keyword. In addition, the received message may also include an authentication value which may need to be validated before the keyword can be used. The method may end in block 509.

If the keyword is determined to be invalid per the policies in block 507, or fails authentication in block 504, then the given cryptographic unit 38 may discard the keyword (block 509). In various embodiments, discarding the keyword may include any combination of setting or clearing a given register bit, setting a given memory location to a predetermined value, and overwriting the received keyword with a given value. The method may end in block 510.

It is noted that, method 500 illustrated in FIG. 5 is merely an example for demonstrating the disclosed concepts. In other embodiments, different operations and different orders of operations are possible and contemplated.

Figure 6:
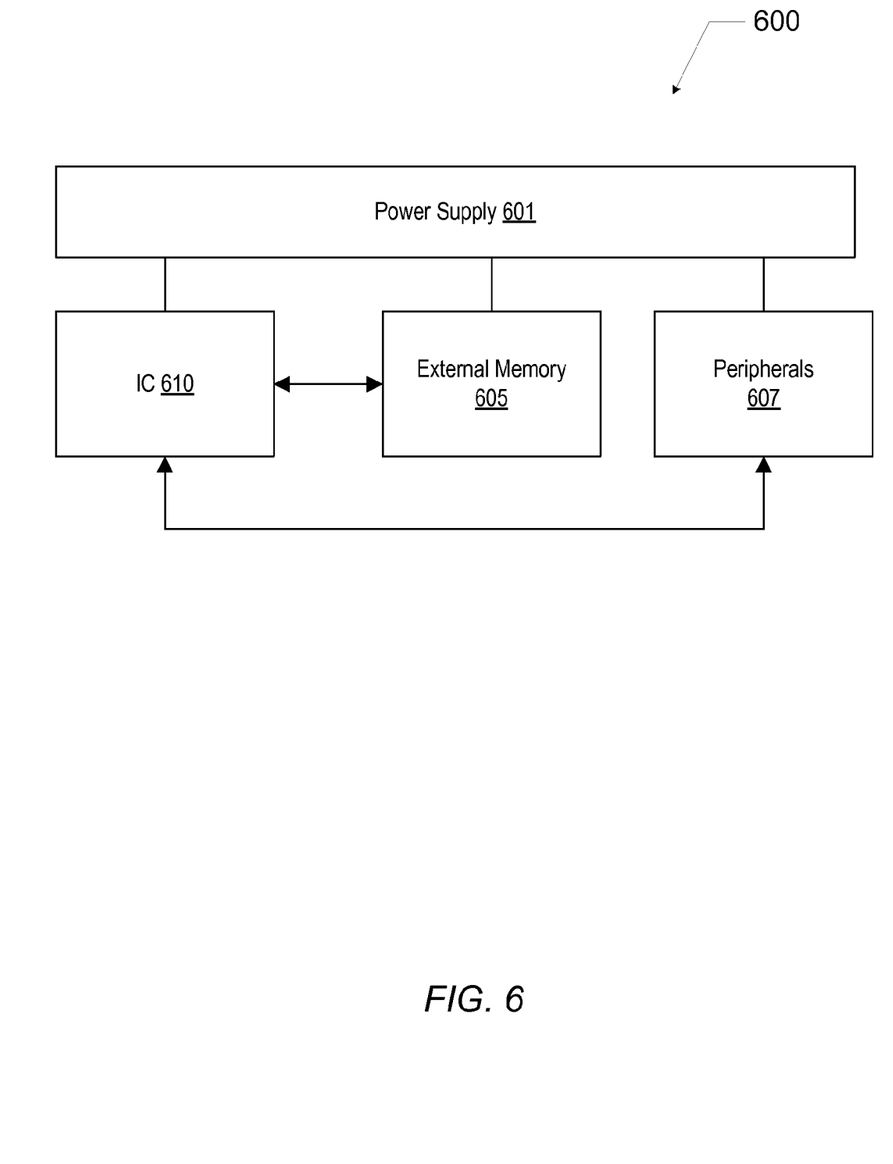
FIG. 6 is a block diagram of one embodiment of a system that includes the SOC of FIG. 1.

Turning to FIG. 6, a block diagram of one embodiment of a system that includes the SOC of FIG. 1 is shown. The system 600 includes an integrated circuit 610, which may correspond to an instance of the SOC 10 of FIG. 1, coupled to one or more peripherals 607 and a system memory 605. The system 600 also includes a power supply 601 that may provide one or more supply voltages to the integrated circuit 610 as well as one or more supply voltages to the memory 605 and/or the peripherals 607. In some embodiments, more than one instance of the integrated circuit 610 may be included.

The peripherals 607 may include any desired circuitry, depending on the type of system. For example, in one embodiment, the system 600 may be included in a mobile device (e.g., personal digital assistant (PDA), smart phone, etc.) and the peripherals 607 may include devices for various types of wireless communication, such as Wi-Fi, Bluetooth, cellular, global positioning system, etc. The peripherals 607 may also include additional storage, including RAM storage, solid-state storage, or disk storage. The peripherals 607 may include user interface devices such as a display screen, including touch display screens or multi-touch display screens, keyboard or other input devices, microphones, speakers, etc. In other embodiments, the system 600 may be included in any type of computing system (e.g. desktop personal computer, laptop, workstation, net top etc.).

The system memory 605 may include any type of memory. For example, as described above in conjunction with FIG. 1, the system memory 605 may be in the DRAM family such as synchronous DRAM (SDRAM), double data rate (DDR, DDR2, DDR3, etc.), or any low power version thereof. However, system memory 605 may also be implemented in static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a security circuit configured to generate a cryptographic keyword based on a fixed value and a received seed value;
a processor configured to:
   determine one or more policies that define allowable usage of the cryptographic keyword, including an indication of one or more functional units of a plurality of functional units that are allowed to use the cryptographic keyword; and
   generate a policy value, wherein the policy value includes one or more data bits indicative of the one or more policies; and
an interface controller configured to:
   generate a message including the cryptographic keyword and the policy value; and
   send the message to at least one circuit block configured to use the cryptographic keyword in a cryptographic operation in compliance with the one or more policies indicated by the policy value.

2. The apparatus of claim 1, wherein the one or more policies further include an indication of at least one encryption algorithm of a plurality of encryption algorithms with which the cryptographic keyword is allowed to be used.

3. The apparatus of claim 1, wherein the one or more policies further include an allowable size for the cryptographic keyword.

4. The apparatus of claim 1, wherein the one or more policies further include an indication that the cryptographic keyword is allowed to be used for encrypting data, and an indication that the cryptographic keyword is allowed to be used for decrypting data.

5. The apparatus of claim 1, wherein the one or more policies further include an indication of an amount of time for which the cryptographic keyword is allowed to be used.

6. The apparatus of claim 1, wherein the security circuit is further configured to encrypt the cryptographic keyword.

7. The apparatus of claim 6, wherein the one or more policies further include an indication of one or more additional operations required to be performed on the message to decrypt the cryptographic keyword.

8. A method, directed to a computing system, comprising:
generating, by a security circuit, at least one cryptographic keyword based on a fixed value and a received seed value;
determining, by a processor of the computing system, one or more policies that define allowable usage of the at least one cryptographic keyword, including an indication of which of one or more functional units are allowed to use the at least one cryptographic keyword;
creating a policy value, wherein the policy value includes one or more data bits indicative of the one or more policies;
generating, by an interface controller, a message including the at least one cryptographic keyword and the policy value;
sending the message to at least one functional unit of the one or more functional units of the computing system; and
using, by the at least one functional unit, the cryptographic keyword in a cryptographic operation in compliance with the one or more policies indicated by the policy value.

9. The method of claim 8, wherein the message includes a plurality of cryptographic keywords, and wherein the one or more policies further includes an indication of a given cryptographic keyword of the plurality of cryptographic keywords is to be used.

10. The method of claim 8, wherein the one or more policies further includes an indication of at least one encryption algorithm of a plurality of encryption algorithms with which the at least one cryptographic keyword is allowed to be used.

11. The method of claim 8, wherein the security circuit is further configured to encrypt the at least one cryptographic keyword, and the one or more policies further includes an indication of one or more additional operations required to be performed on the message to decrypt the at least one cryptographic keyword.

12. The method of claim 8, wherein the one or more policies further includes an allowable size for the at least one cryptographic keyword.

13. The method of claim 8, wherein the one or more policies further includes an indication that the at least one cryptographic keyword is allowed to be used for encrypting data, and wherein the one or more policies includes an indication that the at least one cryptographic keyword is allowed to be used for decrypting data.

14. The method of claim 8, wherein the one or more policies further includes an indication of an amount of time for which the at least one cryptographic keyword is valid.

15. A system comprising:
one or more functional units that each include cryptographic circuitry; and
a security unit configured to:
generate a cryptographic keyword based on a fixed value and a received seed value;
determine one or more policies that indicate allowable usage of the cryptographic keyword, including an indication of which of the one or more functional units are allowed to use the cryptographic keyword;
create a policy value, wherein the policy value includes one or more data bits indicative of the one or more policies;
generate a message including the cryptographic keyword and the policy value; and
send the message to at least one functional unit of the one or more functional units;
wherein the at least one functional unit is configured to:
receive the message; and
utilize the cryptographic keyword in a cryptographic operation in compliance with the one or more policies indicated by the policy value.

16. The system of claim 15, wherein the message includes a plurality of cryptographic keywords, and wherein the one or more policies further include an indication of which cryptographic keyword of the plurality of cryptographic keywords is to be used.

17. The system of claim 15, wherein the one or more policies further include an indication of at least one encryption algorithm of a plurality of encryption algorithms with which the cryptographic keyword is allowed to be used.

18. The system of claim 15, wherein the one or more policies further include an indication of an amount of time for which the cryptographic keyword is valid.

19. The system of claim 15, wherein the one or more policies further include an indication of an allowable size for the cryptographic keyword.

20. The system of claim 15, wherein the one or more policies further include an indication that the cryptographic keyword is allowed to be used for encrypting data, and wherein the one or more policies includes an indication that the cryptographic keyword is allowed to be used for decrypting data.

* * * * *